May 16, 1950

L. A. BOYLAN 2,507,756

MECHANICAL MOVEMENT WITH CONSTANTLY OR INTERMITTENTLY DRIVEN MEMBER

Filed July 13, 1945

INVENTOR.
LOUIS A. BOYLAN.
BY *Harry C. Roberts*
ATTORNEY.

May 16, 1950

L. A. BOYLAN 2,507,756

MECHANICAL MOVEMENT WITH CONSTANTLY
OR INTERMITTENTLY DRIVEN MEMBER

Filed July 13, 1945

INVENTOR.
LOUIS A. BOYLAN.
BY Harry C. Sebute
ATTORNEY.

Patented May 16, 1950

2,507,756

UNITED STATES PATENT OFFICE 2,507,756

MECHANICAL MOVEMENT WITH CONSTANTLY OR INTERMITTENTLY DRIVEN MEMBER

Louis A. Boylan, Chicago, Ill., assignor to Valentine Laboratories, Inc., Chicago, Ill., a corporation of Illinois Application July 13, 1945, Serial No. 604,735

8 Claims. (Cl. 74—112)

1

This invention relates to mechanical movements and more particularly to instrumentalities for converting rotary movement into continuous or intermittent motion, although certain features thereof may be employed with equal advantage for other purposes.

It contemplates more especially the provision of instrumentalities for converting rotary movement into continuous or intermittent motion by merely reversing the directional rotation of a prime mover, such as an electric motor.

One object of the present invention is to simplify the construction and improve the operation of devices of the character mentioned.

Another object is to provide improved means for changing the movement characteristics of instrumentalities by reversing the directional operation of a prime mover, such as an electric motor.

Still another object is to provide improved means for interconnecting a prime mover with a series of different movement producing instrumentalities.

A further object is to provide a series of motion producing instrumentalities interconnected by clutch means to a prime mover that selectively operates one or the other depending upon the direction of rotation thereof.

A still further object is to provide an improved clutch for engaging spaced complemental clutch elements to place selective instrumentalities into operation by controlling the directional movement of the prime mover.

Still a further object is to provide spaced driven clutch elements for operating different instrumentalities with a complemental driver clutch element interposed therebetween to engage one or the other depending upon the directional rotation of the driving clutch element.

Other objects and advantages will appear from the following description of an illustrative embodiment of the present invention.

The structure selected for illustration is not intended to serve as a limitation upon the scope or teachings of the invention, but is merely illustrative thereof. There may be considerable variations and adaptations of all or part of the teachings depending upon the dictates of commercial practice.

The present embodiment comprises a base member 10, preferably though not essentially, of rectangular configuration to support upstanding side frame brackets 11—12 which are cast or otherwise shaped to provide suitable journals 13—14 and 15—16 therein, respectively. The journals 13—14 and 15—16 are, in this instance, superposed in vertical alignment so that the journals 13—15 and 14—16 are in horizontal axial alignment to support shafts therebetween as will appear more fully hereinafter.

It should be noted that the frame brackets 11—12 are formed with integral base flanges 17—18 for contact with the base 10 to enable attachment thereto through the medium of suitable fasteners such as the studs 19—20, respectively. The journals 13—14 and 15—16 have suitably sized bearings 21—22 and 23—24 pressed or otherwise inserted therein to rotatably support shafts 25—26 in the bearings 21—23 and 22—24.

The shaft 25 is split into two sections 27—28 with each of these journalled in the bearings 21—23, respectively, to receive driven clutch elements 29—30 on their confronting spaced extremities 30—31 which are journalled in bearings 32—33. The bearings 32—33 are fitted into journals 34—35 comprising part of upstanding bearing brackets 36—37 that extend downwardly for support by and attachment to the base 10.

In order to prevent the sections 27—28 of the driver shaft 25 to move axially relative to each other, stop collars 38—39 carrying set screws 40—41 radially therethrough are fixed to the shaft sections 27—28, respectively, to abut against the bearings 32—33 and their journals 34—35 that rotatively receive a cylindrical driver clutch element 42 therein and therebetween.

Figures 5, 6, 7, 8:
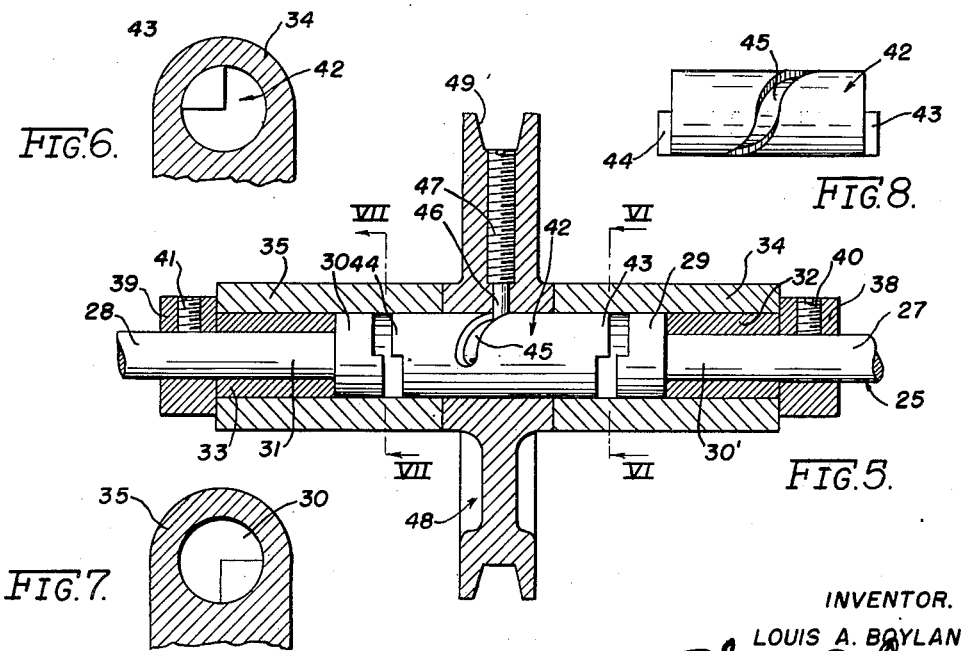
Figure 5 is a fragmentary sectional view in elevation taken substantially along line V—V of Figure 3.
Figure 6 is a fragmentary sectional view of the driver clutch element taken substantially along line VI—VI of Figure 5.
Figure 7 is a fragmentary sectional view in elevation of the driven clutch element taken substantially along line VII—VII of Figure 5.
Figure 8 is a front view in elevation of the driver clutch element in the form of a cylindrical cam serving as the shifting medium therefor.

As shown, the driver clutch element 42 has end clutch elements 43—44 formed thereon to serve as complements of the driven clutch elements 29—30, respectively, which are normally spaced so that the driver clutch element 42 can be out of engagement with either or both as shown in Figure 5. The driver clutch element 42 is provided with a helical cam groove 45 in the surface thereof to cooperate with a cylindrical pin 46 serving as a cam follower and consisting of part of an extended set screw 47 that radially projects through a driving pulley 48 that idles over the driver clutch element 42 serving as a shifting medium so that one or the other of the driver clutch elements 43—44 can be operatively engaged with the driven clutch element complement 29 or 30 depending upon the direction of rotation of pulley 48 which will shift the driver clutch element in the form of the cylindrical cam 42 to the right or left depending upon whether the pulley 48 is driven in a clockwise or counter-clockwise direction.

The pulley 48 has a peripheral groove 49 therein that frictionally receives a belt 50 therein that extends to the armature pulley 51 fixed to the armature shaft 52 of a reversibly electric motor 53 serving as a prime mover to rotate the pulley 48 in one direction or the other. The reversibly electric motor 53 has a base 54 fixed thereto to enable attachment thereof to the frame base 10 through the medium of suitable fasteners such as the studs 55.

The section 27 of the driver shaft 25 projects beyond the frame journal 13 and the bearing 21 to receive a sprocket wheel 56 thereon. The sprocket wheel 56 is aligned with another and a comparatively larger sprocket wheel 57 fixed to the corresponding projecting extremity of the driven shaft 26 for imparting rotary movement therethrough to a sprocket chain 58 that inter-engages the sprocket wheels 56—57.

Figure 2:
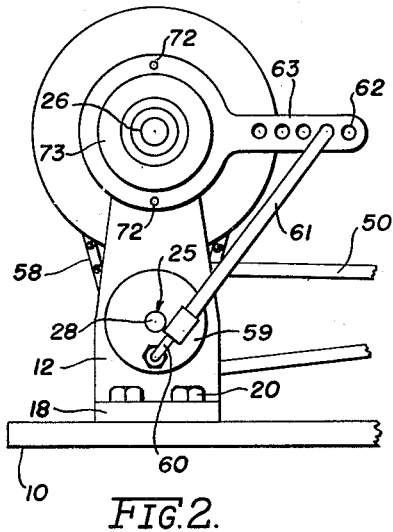
Figure 2 is a fragmentary opposite side view in elevation of the device shown in Figure 1.

The section 28 of the driving shaft 25 has its other projecting extremity provided with a pitman disc 59 attached thereto to support and operate one extremity 60 of an adjustable pitman rod 61. The pitman rod extremity 60 is eccentrically attached to the disc 59 to oscillate the adjustable pitman rod 61 having its other extremity engaging one of a series of apertures 62 (Figure 2) in a ratcheting arm 63 comprising part of an apertured disc 64.

Figure 4:
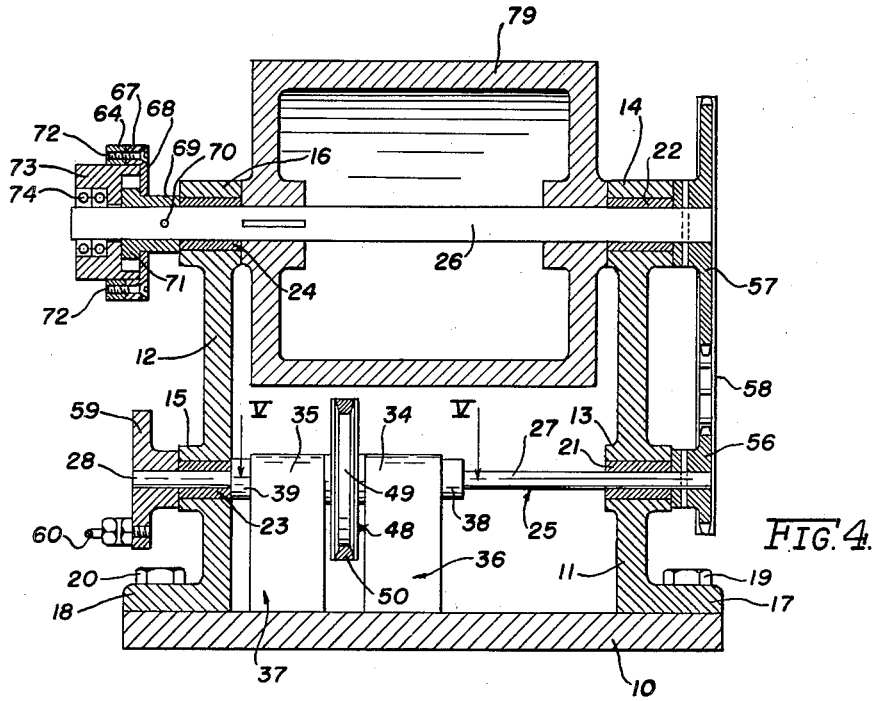
Figure 4 is a sectional view in elevation taken substantially along line IV—IV of Figure 1.

A cotter pin or other suitable fastener 65 (Figure 1) projects through the offset extremity 66 of the adjustable pitman rod 61 to retain connection in any one of the selected apertures 62 provided in the ratcheting arm 63. The apertured disc 64 is, in this instance, attached to a peripheral flange 67 (Figure 4) comprising part of a clutch element casing 68 which is journalled on collar 69 fixed to the other projecting extremits of the driven shaft 26 by means of a suitable pin 70. The collar 69 has a peripheral shoulder 71 that retains the clutch casing 68 in assembled relation therewith.

Figure 3:
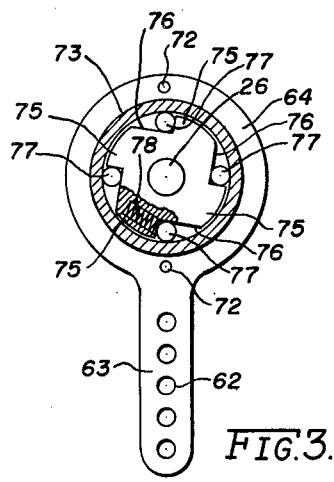
Figure 3 is a fragmentary sectional view of a friction clutch ratcheting element shown in operative assembled relation in the device shown in Figures 1 and 2.

Suitable threaded studs 72 are circumferentially spaced around and through the apertured plate 64 and clutch casing flange 67 to operatively connect the ratcheting arms 63 with the clutch casing 68. A clutch element 73 comprising a cylindrical member is journalled on the projecting extremity of the driven shaft 26 by means of ball bearing raceways 74. The clutch element 73 provides a series of peripheral radially extending ratchet teeth 75 which present intermediate tangential notches 76 for defining a pathway with the confronting clutch casing flange 67 for friction rollers or balls 77 that establish friction engagement therewith in one direction of ratcheting rotation and free reverse oscillation owing to the spring inserts 78 (Figure 3) which extend tangentially within the ratchet teeth 75 which urge the friction rollers or balls 77 in the direction of the clutch casing flange 67.

Figure 1:
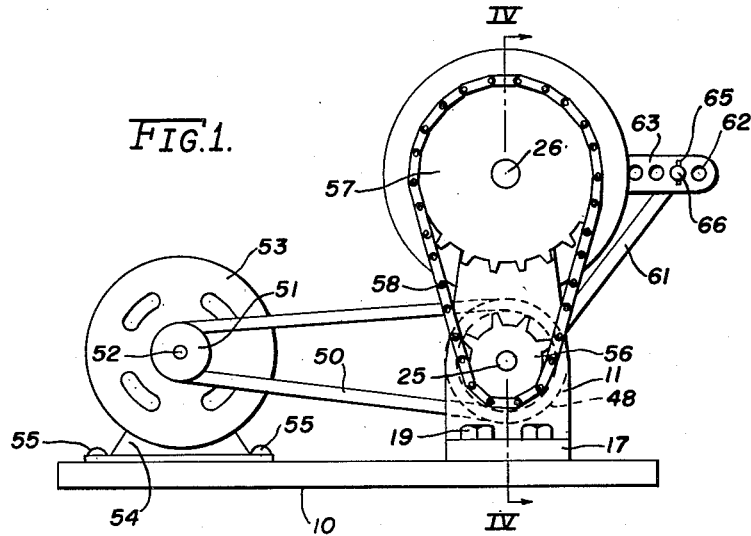
Figure 1 is a side view in elevation of a device embodying features of the present invention.

Consequently, the continuous counter-clockwise rotation of the section 28 of the driver shaft 25 will impart intermittent rotation to the driven shaft 26 in a corresponding counter-clockwise direction (viewed from Figures 1 and 3) and this is effected through corresponding counter-clockwise rotation of the driving pulley 48 and the electric motor 53 (viewed from Figure 1). The counter-clockwise rotation of the pulley 48 will shift the driver clutch element 42 to the left (viewed from Figure 5) and thus cause the driver clutch element 44 to engage the driver clutch element 30 to effect this directional intermittent rotation of the driven shaft 26. With this arrangement of parts, the section 27 of the driver shaft 25 is inoperative except to idle in reverse responsive to the intermittent rotation of the driven shaft 26.

When it is desired to continuously rotate the shaft 26, this can be effected by reversing the electric motor 53 to rotate the pulley 48 in a clockwise direction (viewed from Figure 1) in order to shift the driver clutch element 42 toward the right (viewed from Figure 5) and thus effect engagement between the driver clutch element 43 and the driven clutch element 29. With this arrangement of parts, section 28 of the driving shaft 25 is inoperative in that the driver clutch element 44 is out of engagement with the driven clutch element 30.

The driven shaft 26 that is either intermittently rotated or continuously driven, depending upon the direction of rotation of the reversible electric motor 53, may carry any suitable instrumentality for movement therewith. In the present embodiment, the driven shaft 76 carries a large conveyor roller 79 which may drive a conveyor or for that matter, the driven shaft 26 can carry a gear for operative connection to any other suitable instrumentalities where such dual movement characteristics may perform a universal function within the dictates of commercial practice.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a device of the character described, the combination with a frame, of a driven shaft journalled for rotation in said frame, a pair of axially aligned and spaced driver shafts journalled in said frame, connecting means between one of said driver shafts and said driven shaft to impart continuous movement thereto, other connecting means between the other of said driver shafts and said driven shaft to impart intermittent rotary movement thereto, and rotary reversible power means including a directional rotary clutch element having axial ends complemental to and disposed between the confronting ends of said driver shafts for axial displacement in meshing engagement with one or the other of said driver shafts depending upon the direction of rotation of said power means.

2. In a device of the character described, the combination with a frame, of a driven shaft journalled for rotation in said frame, a pair of driver shafts journalled in said frame, connecting means including a crank arm between one of said driver shafts and said driven shaft to impart continuous movement thereto, other connecting means between the other of said driver shafts and said driven shaft to impart intermittent rotary movement thereto, and rotary reversible power means including a directional rotary clutch element having axial ends complemental to and disposed between the confronting ends of said driver shafts for axial displacement in meshing engagement with one or the other of said driver shafts depending upon the direction of rotation of said power means.

3. In a device of the character described, the combination with a frame, of a driven shaft journalled for rotation in said frame, a pair of driver shafts journalled in said frame, connecting means including a crank arm and ratchet element between one of said driver shafts and said driven shaft to impart continuous movement thereto, other connecting means between the other of said driver shafts and said driven shaft to impart intermittent rotary movement thereto, and rotary reversible power means including a directional rotary clutch element having axial ends complemental to and disposed between the confronting ends of said driver shafts for axial displacement in meshing engagement with one or the other of said driver shafts depending upon the direction of rotation of said power means.

4. In a device of the character described, the combination with a frame, of a driven shaft journalled for rotation in said frame, a pair of axially aligned and spaced driver shafts journalled in said frame, connecting means between one of said driver shafts and said driven shaft to impart continuous movement thereto, other connecting means between the other of said driver shafts and said driven shaft to impart intermittent rotary movement thereto, and rotary reversible power means including a directional rotary clutch element having axial ends complemental to and disposed between the confronting ends of said driver shafts for axial displacement in meshing engagement with one or the other of said driver shafts including a reversible motor depending upon the direction of rotation of said power means.

5. In a device of the character described, the combination with a frame, of a driven shaft journalled for rotation in said frame, a pair of driver shafts journalled in said frame, connecting means including a crank arm and ratchet element between one of said driver shafts and said driven shaft to impart continuous movement thereto, other connecting means between the other of said driver shafts and said driven shaft to impart intermittent rotary movement thereto, and rotary reversible power means including a directional rotary clutch element having axial ends complemental to and disposed between the confronting ends of said driver shafts for axial displacement in meshing engagement with one or the other of said driver shafts including a reversible motor for depending upon the direction of rotation of said power means.

6. In a device of the character described, the combination with a frame, of a driven shaft journalled for rotation in said frame, a pair of driver shafts journalled in said frame, connecting means between one of said driver shafts and said driven shaft to impart continuous movement thereto, other connecting means between the other of said driver shafts and said driven shaft to impart intermittent rotary movement thereto, a pair of spaced confronting driven clutch elements on said driver shafts, a driver clutch element complemental to both of said driven clutch elements on said driver shafts, and reversible rotary driven means for shifting said driver clutch elements in engagement with one or the other of said driven clutch elements through said clutch elements.

7. In a device of the character described, the combination with a frame, of a driven shaft journalled for rotation in said frame, a pair of driver shafts journalled in said frame, connecting means between one of said driver shafts and said driven shaft to impart continuous movement thereto, other connecting means between the other of said driver shafts and said driven shaft to impart intermittent rotary movement thereto, a pair of spaced confronting driven clutch elements on said driver shafts, a driver clutch element complemental to both of said driven clutch elements on said driver shafts, and reversible rotary driven cam follower means for shifting said driver clutch elements in engagement with one or the other of said driven clutch elements through said clutch elements responsive to the directional rotation of said power means.

8. In a device of the character described, the combination with a frame, of a driven shaft journalled for rotation in said frame, a pair of driver shafts journaled in said frame, connecting means between the other of said driver shafts and said driven shaft to impart intermittent rotary movement thereto, a pair of spaced confronting driven clutch elements on said driver shafts, a driver clutch element complemental to both of said driven clutch elements on said driver shafts, and reversible rotary driven cam follower means including a reversible motor for shifting said driver clutch elements in engagement with one or the other of said driven clutch elements through said clutch elements responsive to the directional rotation of said power means.

LOUIS A. BOYLAN.

REFERENCES CITED

The following references are of record in the file of this patent:

UNITED STATES PATENTS

| Number | Name | Date |
|---|---|---|
| 500,484 | Goffney | June 27, 1893 |
| 915,976 | Lindenthaler et al. | Mar. 23, 1909 |
| 1,035,604 | Kissel | Aug. 13, 1912 |
| 1,081,636 | Sundh | Dec. 16, 1913 |
| 1,138,970 | Pierce | May 11, 1915 |
| 1,170,653 | Marette | Feb. 8, 1916 |
| 1,376,015 | Hamilton | Apr. 26, 1921 |
| 1,951,211 | Sass | Mar. 13, 1934 |

FOREIGN PATENTS

| Number | Country | Date |
|---|---|---|
| 87,429 | Switzerland | Mar. 2, 1920 |